Oct. 27, 1953  R. T. SCHOERNER  2,656,981
HEATER FITTING AND CONNECTION
Filed March 17, 1951

INVENTOR
RUDOLPH T. SCHOERNER

BY Pollard and Johnston
ATTORNEYS

Patented Oct. 27, 1953

2,656,981

UNITED STATES PATENT OFFICE 2,656,981

HEATER FITTING AND CONNECTION

Rudolph T. Schoerner, Cranston, R. I., assignor to Taco Heaters, Incorporated, Providence, R. I., a corporation of New York Application March 17, 1951, Serial No. 216,123

2 Claims. (Cl. 236—12)

This invention relates to a means for mounting an automatic regulating valve on a fluid heater or the like and particularly to an arrangement for facilitating connection of such a valve to the heater.

If the water is to be heated for household purposes, the heater normally will have a cold water inlet and a hot water outlet. Frequently it is desirable to connect a thermostatic valve between said inlet and outlet arranged to admit cold water to the water being delivered by the heater from the hot water outlet so as to guard against excessively hot domestic water. Such a valve functions to modify the temperature of the delivered water by admitting cold inlet water to the heated water from the heater when the water becomes too hot for use. A particular problem is involved in the arrangement and fastening of such a valve to the heater, it being desirable to provide a flexible arrangement so that the parts may be readily and quickly assembled at the point of use and so that the assembly can be made according to the particular installation.

One of the objects of the invention is to provide an improved arrangement permitting rapid assembly of an automatic or thermostatic valve to a domestic hot water heater or the like.

In one aspect of the invention, the heater can be provided with a cold water inlet pipe and a hot water outlet pipe. One type of automatic valve means which may be used is a thermostatically controlled device, the thermostat thereof being subjected to the hot water from the heater and arranged so as to control flow of cold water to said hot water outlet so as to keep the delivered water from becoming too hot. When the hot water from the heater reaches too high a temperature, the thermostatic element will open its valve to permit flow of cold water to the hot water to be delivered from the delivery connection to the system. The valve means can be connected to fittings mounted on the heater. One of the fittings can connect the cold water supply with the cold water inlet for the thermostatic valve and with the cold water inlet to the heater. Another fitting can be provided for connecting the hot water outlet from the heater to the thermostatic valve. The fittings can be removably connected to the valve in such a manner as to be rigid relative thereto.

Each fitting has a fluid conduit therethrough with a transverse aperture through the walls thereof and through which a connector can be passed. The connectors can be fastened to the heater, such as by a screw threaded joint with the heater inlet and outlet passage respectively, so as to hold the fittings and valve in assembled relationship with the heater. The connectors have passages therethrough for conducting water to or from the fitting relative to the particular heater passage involved.

Various types of heaters can be used and the connection can be directly to the heater or to a terminal or other means associated therewith. Also, various arrangements of regulating valves can be used.

These and other objects, advantages and features of the invention will become apparent from the following description and drawings.

Figure 1:
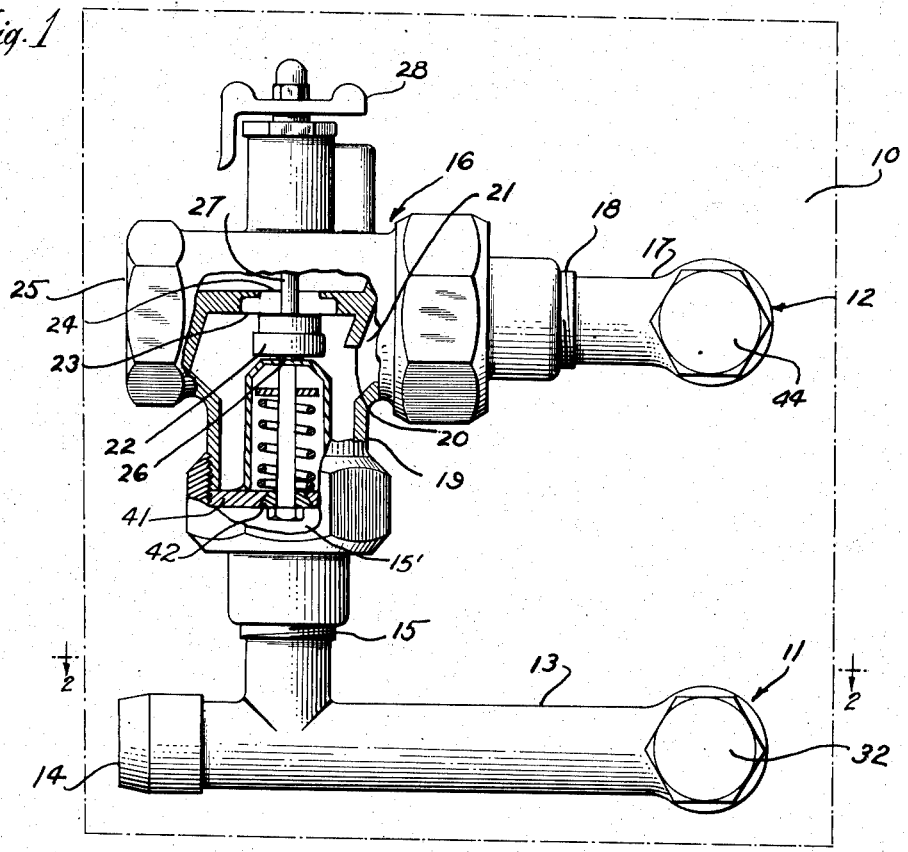
Fig. 1 is a view partially in section of one form of the invention.

The invention will be described particularly in conjunction with its use on a domestic water heater wherein it is desirable to guard against excessively hot domestic water, but it is to be understood that it can be used for other purposes.

Heater 10 is schematically illustrated and it may consist of a conventional heater having heating elements such as coils or tubes. It may have its heating elements inserted into the domestic boiler or the heater may be otherwise supplied with heat. The heater is provided with a cold water inlet 11 and a hot water outlet 12. Inlet fitting 13 can have a fitting 14 for connecting the same to the cold water supply and an extension 15 for connecting the thermostatic valve 16 therewith. Outlet fitting 17 can have a portion 18 for joining the same with the hot water connection of the thermostatic valve 16.

Thermostatic or regulating valve 16 may take various forms, one suitable type being described herein. The valve may comprise a body 19 having a wall 20 extending across the hot water inlet passage 21.

Wall 23 may have an aperture 24 through which combined hot and tempering cold water can flow to the delivery connection 25 of thermostatic valve 16. Thermostatic element 22 controls movement of valve stem 26 which in turn operates a valve 42 in plate 41 in valve cold water inlet 15'. The valve in the cold water inlet normally is closed, expansion of the thermostat opening valve 42. Thermostatic element 22 may have an adjustable abutment 27 settable by handle 28 for the purpose of setting the thermostat and thus determining the maximum water temperature delivered from the valve and heater arrangement.

Figure 2:
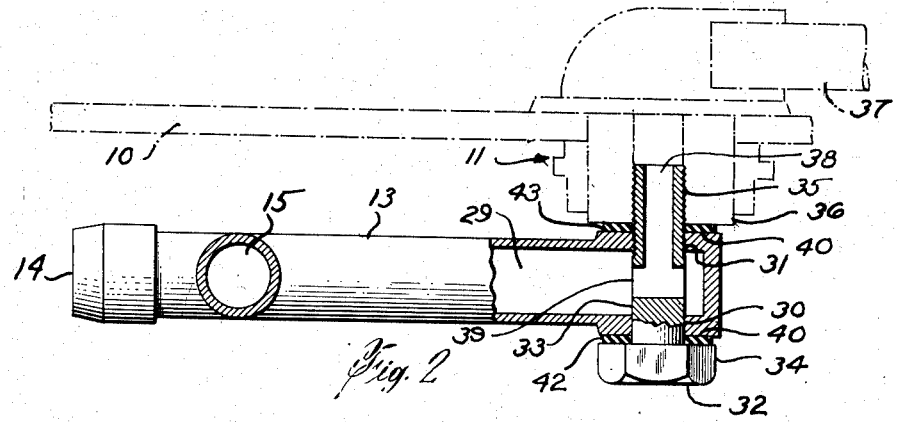
Fig. 2 is a view taken along the line 2—2 of Fig. 1.

Fittings or valve supports 13 and 17 both may be connected to their respective water terminals of the heater in the manner to be described. The inlet fitting 13 will be specifically described, there being a similar connection for the hot water or outlet fitting 17. Fitting 13 has a fluid conduit 29 (Fig. 2) and has apertures 30, 31 adjacent the end thereof and transversely located relative to conduit 29. It is to be understood, of course, that the angular location of apertures 30, 31 relative to the fluid conduit 29 and the fitting may be as desired for the particular device involved. Connector 32 has a body 33 with a head 34 thereon. The end of the body 33 opposite to head 34 may be threaded at 35 so as to be engageable with suitable screw threads in the inlet opening in the cold water terminal 36 of the heater. The cold water terminal 36 has suitable passages connecting it to the first coil or tube 37 of the heater.

Body 33 of connector 32 has a water channel or bore 38 therethrough which has a connection 39 with the fluid conduit 29. Sealing seats 40, 41 for receiving suitable washers 42, 43 are on the flattened portions of the fitting 13 and surround the apertures 30, 31.

The fittings 13 and 17 can be assembled with the valve and then the connectors 32 and 44 inserted in their apertures and screw-threadedly engaged with the fluid openings associated with heater, the connectors being suitably tightened to hold the assembly in place in fluid tight relationship with the heater. The connectors will provide fluid communication between the fittings and the heater. It should be evident that the thermostatic valve 16 can be assembled before or afterwards to the fittings 13 and 17.

It should be apparent that the shape and details of construction can be changed without departing from the spirit of the invention except as defined in the appended claims.

What is claimed is:

1. In a fluid heater arrangement having a fluid inlet opening and a fluid outlet opening with a thermostatic regulating valve connectable therebetween, said valve having a delivery connection, said valve regulating the mixing of inlet fluid with heater outlet fluid according to the temperature of the heater outlet fluid, the combination including an elongated inlet fitting having an opening connectable to a source of inlet fluid, an opening connectable to said valve, and an opening connectable to said fluid inlet opening of the heater, said fitting having a fluid conduit extending along the same and having an aperture thereacross for receiving a connector, an outlet fitting connectable to said fluid outlet opening of the heater and having an opening connectable to said valve, said fitting having a fluid conduit extending between said openings and having an aperture thereacross for receiving a connector, and connectors insertable through said apertures in said fittings and screw-threadedly engageable in said openings in said heater, said connectors having channels therein connecting the fluid conduit of its fitting with its heater fluid opening.

2. In a fluid heater arrangement having a fluid inlet opening and a fluid outlet opening with a thermostatic regulating valve connectable therebetween, said valve having a delivery connection, said valve regulating the mixing of inlet fluid with heater outlet fluid according to the temperature of the heater outlet fluid, the combination including an elongated inlet fitting having an opening connectable to a source of inlet fluid, an opening connectable to said valve, and an opening connectable to said fluid inlet opening of the heater, said fitting having a fluid conduit extending along the same and having an aperture thereacross for receiving a connector, fluid sealing seats on the exterior of said fitting on opposite sides thereof surrounding said aperture, an outlet fitting connectable to said fluid outlet opening of the heater and having an opening connectable to said valve, said fitting having a fluid conduit extending between said openings and having an aperture thereacross for receiving a connector, fluid sealing seats on the exterior of said fitting on opposite sides thereof surrounding said aperture, and connectors having bodies insertable through said aperture in said fittings and screw-threadedly engageable in said openings in said heater, said connectors having channels therein connecting the fluid conduit of its fitting with its heater fluid openings, heads at one end of each of said connectors having a portion cooperable with one of said sealing seats, the area adjacent the other sealing seat cooperating with its fluid heater opening to provide fluid-tight joints.

RUDOLPH T. SCHOERNER.

References Cited in the file of this patent

UNITED STATES PATENTS

| Number | Name | Date |
| --- | --- | --- |
| 1,086,807 | Conrath | Feb. 10, 1914 |
| 1,559,706 | Jennings | Nov. 3, 1925 |
| 1,607,096 | Mueller | Nov. 16, 1926 |
| 1,942,270 | Resek | Jan. 2, 1934 |
| 2,515,885 | Midyette | July 18, 1950 |